(12) United States Patent
Lim et al.

(10) Patent No.: US 10,310,070 B2
(45) Date of Patent: Jun. 4, 2019

(54) RADIO ALTIMETER

(71) Applicant: MUTRONICS CO., LTD., Anseong-si, Gyeonggi-do (KR)

(72) Inventors: Tae-Wook Lim, Suwon-si (KR); Jae-Hong Lim, Suwon-si (KR); Seung-Mo Park, Suwon-si (KR); Kwang-Won Lee, Suwon-si (KR)

(73) Assignee: MUTRONICS CO., LTD., Anseong-si, Gyeonggi-Do (KR)

( * ) Notice: Subject to any disclaimer, the term of this patent is extended or adjusted under 35 U.S.C. 154(b) by 0 days.

(21) Appl. No.: 16/018,299

(22) Filed: Jun. 26, 2018

(65) Prior Publication Data

US 2018/0299542 A1 Oct. 18, 2018

Related U.S. Application Data

(62) Division of application No. 14/408,317, filed as application No. PCT/KR2013/005170 on Jun. 12, 2013, now Pat. No. 10,036,807.

(30) Foreign Application Priority Data

Jun. 18, 2012 (KR) ........................ 10-2012-0065055

(51) Int. Cl.
*G01S 13/88* (2006.01)
*G01S 7/35* (2006.01)
(Continued)

(52) U.S. Cl.
CPC .............. *G01S 13/882* (2013.01); *G01S 7/35* (2013.01); *G01S 13/32* (2013.01); *G01S 13/345* (2013.01);
(Continued)

(58) Field of Classification Search
CPC .......... G01S 13/32; G01S 7/35; G01S 13/882; G01S 13/34–13/40; G01S 13/18; G01S 2007/4065
See application file for complete search history.

(56) References Cited

U.S. PATENT DOCUMENTS 4,714,928 A * 12/1987 Schmitt ................. G01S 7/4021
342/122
4,825,214 A * 4/1989 Dejaegher ............... G01S 7/038
342/128

(Continued)

*Primary Examiner* — Matthew M Barker
(74) *Attorney, Agent, or Firm* — Kile Park Reed & Houtteman PLLC

(57) ABSTRACT

A radio altimeter includes a voltage controlled oscillator outputting a radio frequency signal through a forward path in a direction from the voltage controlled oscillator to a radio frequency antenna, a path extending unit positioned in the forward path to receive the radio frequency signal to delay the radio frequency signal to generate a delayed radio frequency signal. The radio frequency antenna transmits the delayed radio frequency signal to ground and receives the delayed radio frequency signal reflected from the ground. The radio altimeter also includes a mixer that receives the reflected delayed radio frequency signal through a signal reception path from the radio frequency antenna and the radio frequency signal from the voltage controlled oscillator and mixes the radio frequency signal and the reflected delayed radio frequency signal to output a beat frequency signal which is used to calculate altitude with respect to the ground.

2 Claims, 2 Drawing Sheets

(51) Int. Cl.
*G01S 13/34* (2006.01)
*G01S 13/32* (2006.01)
G01S 13/18 (2006.01)
G01S 7/40 (2006.01)

(52) U.S. Cl.
CPC ....... *G01S 13/18* (2013.01); *G01S 2007/4065* (2013.01)

(56) References Cited

U.S. PATENT DOCUMENTS

| | | | |
|---|---|---|---|
| 5,272,484 A * | 12/1993 | Labaar | H01Q 3/2682 342/175 |
| 6,426,717 B1 * | 7/2002 | Maloratsky | G01S 13/08 342/120 |
| 7,239,266 B2 * | 7/2007 | Vacanti | G01S 7/032 342/103 |
| 9,297,885 B2 * | 3/2016 | Ferguson | G01S 7/023 |
| 9,575,171 B1 * | 2/2017 | Tetrault | G01S 13/882 |

* cited by examiner

[Figure 1] (Prior Art)
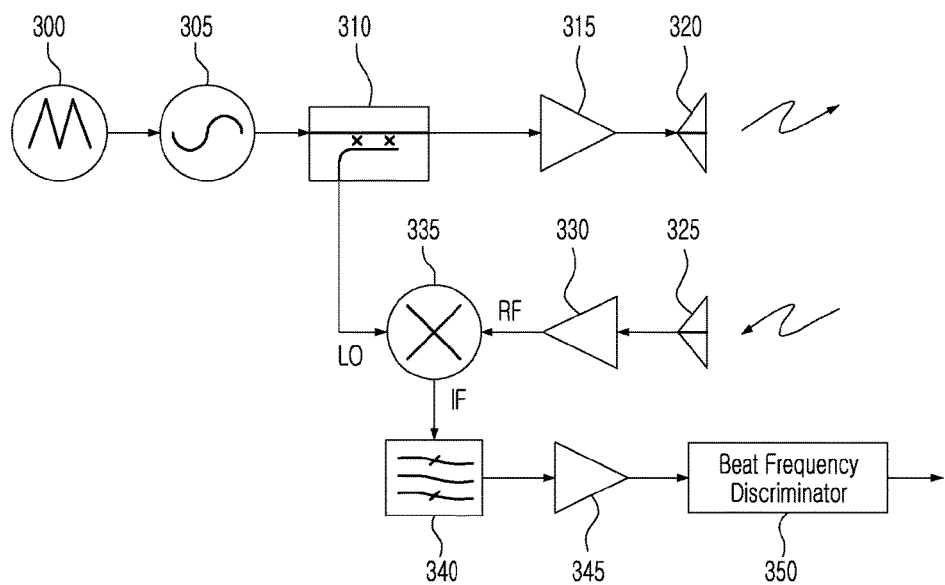
[Figure 2] (Prior Art)
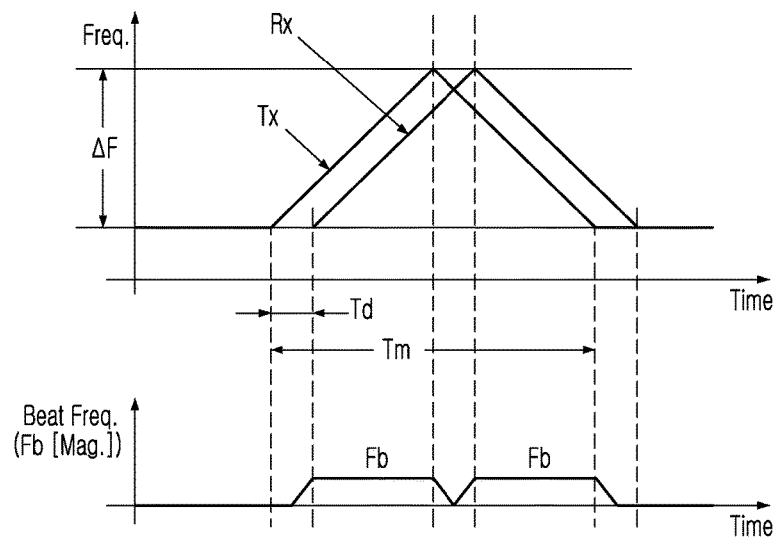

[Figure 3]
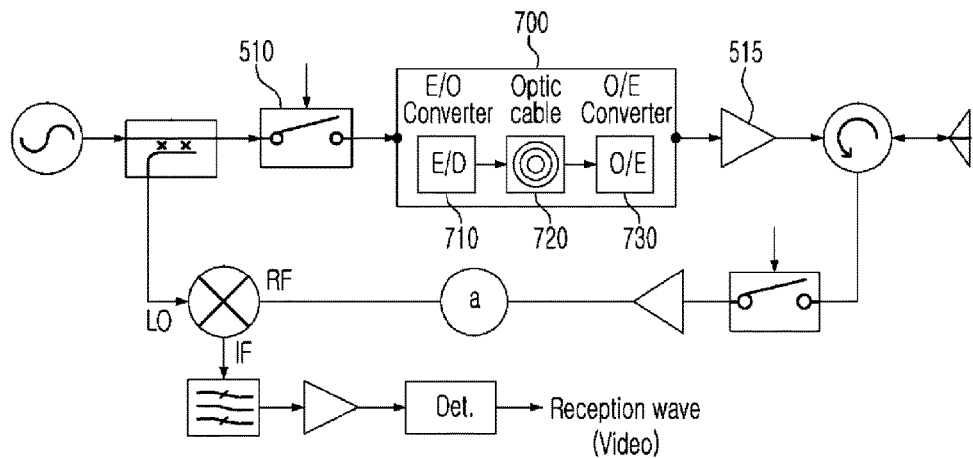
[Figure 4]
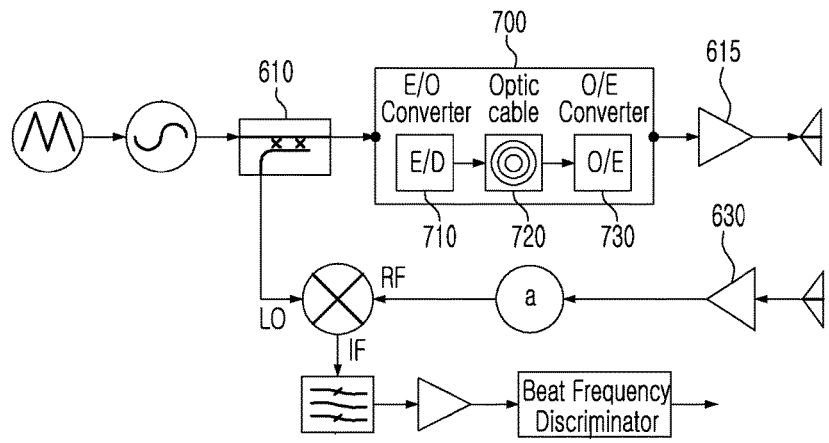

RADIO ALTIMETER

CROSS REFERENCE TO RELATED APPLICATIONS

This application is a divisional application of U.S. patent application Ser. No. 14/408,317, filed on Dec. 16, 2014 (currently pending), the disclosure of which is herein incorporated by reference in its entirety. The U.S. patent application Ser. No. 14/408,317 is a national entry of International Application No. PCT/KR2013/005170, filed on Jun. 12, 2013, which claims priority to Korean Application No. 10-2012-0065055 filed on Jun. 18, 2012, the entire contents of which are incorporated herein by reference.

TECHNICAL FIELD

The present disclosure relates to a frequency modulated-continuous wave (FM-CW) radio altimeter including a path extending unit capable of considerably reducing a dynamic measurement range by delaying a signal provided from the outside in a transmission or reception path of the radio altimeter.

BACKGROUND ART

Radio altimeters are a type of equipment installed in vehicles capable of flight, such as fixed-wing aircraft or helicopters, to measure the altitude (altitude above ground level (AGL)) of such a vehicle above terrain therebelow while in flight. To do this, a radio altimeter uses the principle of radar, transmitting radio waves toward the ground and measuring a time delay between the transmission of radio waves and the reception of reflected radio waves.

Radio altimeters include radio altimeters based on a radar pulse limited altimetry scheme corresponding to an amplitude modulation scheme as well as to radio altimeters based on a frequency modulated-continuous wave (FM-CW) scheme corresponding to a frequency modulation scheme. Thereamong, the FM-CW radio altimeter will be described with reference to FIGS. 1 and 2.

FIG. 1 is a block diagram illustrating a configuration of a general FM-CW radio altimeter, while FIG. 2 is a view illustrating the principle of calculating altitude using the FM-CW scheme of FIG. 1.

When the FM-CW radio altimeter transmits a transmission signal by linearly changing a frequency thereof over time, a signal reflected from a target and returned to the FM-CW radio altimeter has a time delay corresponding to altitude, and here, a beat frequency between the transmission and reception signals is measured to calculate a distance.

An operation of the FM-CW radio altimeter will be briefly described hereinafter with reference to FIGS. 1 and 2.

A frequency of a signal generated by a waveform generator 300 is linearly varied by a voltage controlled oscillator (VCO) 305. The linearly varied frequency signal is divided by a directional coupler 310 so as to be input to a power amplifier 315 and a mixer 335, and a power-amplified signal is transmitted to the ground through an RF transmission antenna 320.

When a linearly varied frequency signal (RF signal) reflected from the ground is input through an RF reception antenna 325, the RF pulse signal is amplified by a low noise amplifier 330 and is subsequently input to the mixer 335. The mixer 335 mixes the local signal input from the directional coupler 310 and the RF signal input from the low noise amplifier 330 and outputs a beat frequency signal corresponding to a difference between the two signals.

The beat frequency passes through a band pass filter 340 to only filter out a signal within a predetermined bandwidth, and the filtered signal being amplified by an intermediate frequency (IF) amplifier 345 and subsequently input to a beat frequency discriminator 350. The beat frequency discriminator 350 identifies a beat frequency $F_b$ of the received signal and calculates altitude based on the identified beat frequency.

Here, altitude may also be obtained by configuring a closed loop uniformly maintaining the beat frequency that appears in proportion to altitude and measuring frequency variations over time. Employing such a method, a bandwidth of an IF amp can be limited to be narrow, considerably increasing an S/N radio, and thus, a high level of precision in distance measurement may be obtained, even at a small transmission output.

Meanwhile, even in the case that a transmission output is increased, a detection distance of a target is limited due to a signal component directly leaked from a transmitting end to a receiving end; thus, in general, this method is largely used in short-range sensors for a short detection distance with a low transmission power.

The method of calculating altitude using a beat frequency ($F_b$) over distance is as shown in Equation (1). Here, as illustrated in FIG. 2, $T_m$ denotes a period of the linearly varied frequency signal and $\Delta F$ denotes frequency variations of the linearly varied frequency signal.

$$F_b = \frac{2 \cdot \Delta f \cdot T_d}{T_m} = \frac{4 \cdot \Delta f \cdot f_m}{3 \cdot 10^8} \cdot H \quad (1)$$

where, $$T_m = \frac{1}{f_m} \cdot T_d = \frac{2H}{C} = \frac{2H}{3 \cdot 10^8} \cdot F_b > f_m$$

However, related art radio altimeters are generally classified as short-range or medium and long-range radio altimeters, in terms of the intended purpose thereof, and when a wide range of altitude measurement from a short distance to a long distance is required, the following problems may arise in the use thereof.

For example, a case in which a wide range of altitude measurement from 1 m to 10,000 m is required is taken as an example.

In the case of the FM-CW radar scheme, when an altitude is changed 10,000 times from 1 m to 10,000 m, the beat frequency Fb is also changed by 10,000 times, and here, it is considerably difficult to accurately measure a frequency range of such a degree and a bandwidth of a receiving end should be considerably widened when actually implemented, resultantly increasing a medium detectable signal (MDS) level of the receiver, which makes it difficult to measure a small reception signal when input. In particular, in a case in which the beat frequency Fb according to altitude needs to be uniformly maintained through feedback, frequency variations Δf (or fm) need to be changed with a difference of 10,000 times, and this is also substantially impossible to implement in actuality.

Thus, the pulse limited altimetry scheme is only used for medium and long-range detection and the FM-CW scheme is only used for short-range detection rather than for extremely short range detection.

DISCLOSURE

Technical Problem

An aspect of the present disclosure may provide a technique of delaying a signal provided from the outside through a path extending unit positioned in a transmission path or a reception path of a radio altimeter to considerably reduce a dynamic measurement range.

Technical Solution

According to an aspect of the present disclosure, there is provided a radio altimeter including a path extending unit positioned in a signal transmission path or a signal reception path of the radio altimeter, wherein the path extending unit delays a signal received from the outside to reduce a dynamic range of the radio altimeter.

The path extending unit may reduce the dynamic range of the radio altimeter to $1/10$ to $1/1,000$.

The path extending unit may include: an electro-optical (E/O) converter converting the external signal as an RF signal into an optical signal; an optical cable delaying the optical signal; and a photoelectric (O/E) converter re-converting the optical signal into an RF signal.

The optical cable may have a length sufficient for reducing a frequency band of transmitting/receiving end components of the radio altimeter to $1/10$ to $1/1,000$.

The electro-optical converter may employ an analog modulation scheme of amplitude-modulating an output from a laser diode by using an RF signal, and the O/E converter may employ an analog amplitude modulation/demodulation scheme of detecting an amount of input light by using an optical sensor, and outputting a corresponding signal.

The radio altimeter may use a frequency modulated-continuous wave (FM-CW) scheme, and the path extending unit may be inserted into a rear stage of a directional coupler dividing an output signal from a voltage controlled oscillator (VCO) outputting a linearly variable frequency signal.

Advantageous Effects

According to exemplary embodiments of the present disclosure, by delaying a signal through the path extending unit to thus reduce a dynamic range, a limitation in a frequency band of components may be overcome, and a wide measurement range from a short distance to a medium and long distance can be effectively provided, improving generality of measurement devices.

DESCRIPTION OF DRAWINGS

FIG. 1 is a block diagram illustrating a configuration of a general frequency modulated-continuous wave (FM-CW) radio altimeter;

FIG. 2 is a view illustrating the principle of calculating altitude using the FM-CW radio altimeter of FIG. 3.

FIG. 3 is a block diagram illustrating a configuration of a pulse limited altimeter according to an exemplary embodiment of the present disclosure.

FIG. 4 is a block diagram illustrating a configuration of an FM-CW radio altimeter according to an exemplary embodiment of the present disclosure.

BEST MODE

Hereinafter, exemplary embodiments of the present disclosure will be described in detail with reference to the accompanying drawings.

First, characteristic concepts of the present disclosure common to two embodiments will be described as follows.

As described above, in a case in which a wide range of altitude measurement, from a very short distance to a long distance, is required, for example, a range of measurement altitude from 1 m to 10,000 m, when a path having a predetermined distance is added to a transmission (or reception) path of radio waves, a dynamic measurement range may be reduced.

For example, when a path equal to a distance of 200 m (since this is a round-trip distance, an altitude of 100 m) is inserted into a transmission or reception path, a range of actual measurement altitude ranges from 101 m to 10,100 m, obtaining an effect that a dynamic range of a maximum altitude with respect to a minimum altitude is reduced to 100 times (20 dB) from that of the related art 10,000 times (40 dB).

In this regard, in the case of using an optical cable included as an embodiment of a path extending unit, even when the optical cable is considerably long, a loss thereof is 1 dB/km or less, substantially small, and since there is no burden of size, an optical cable having a length of tens of kilometers may be inserted. In addition, in the case of using an optical cable having a length of 200 meters, a dynamic range of measurement altitude is reduced to the 20 dB level. Hereinafter, effective advantages of altitude measurement according to the insertion of an optical cable will be described with reference to a specific exemplary embodiment.

MODE FOR INVENTION

FIG. 3 is a block diagram illustrating a configuration of a pulse limited altimeter according to an exemplary embodiment of the present disclosure.

In the exemplary embodiment of FIG. 3 the path extending unit 700 is installed between the modulation switch 510 and the power amplifier 515 to extend an optical path between transmission and reception of a pulse signal. In the case in which the extended optical path is 200 meters, a minimum measurement altitude is 101 meters, whereby a width of a maximum transmission pulse may be increased from the conventional 6.67 ns to 670 ns, and thus, a bandwidth of a receiving end may be reduced to $1/100$, which also reduces MDS of the receiver to $1/100$ (=20 dB).

The path extending unit 700 includes an electro-optical (E/O) converter converting an RF pulse signal input from the modulation switch 510 into an optical signal, an optical cable 720 inserted into the path by a length required for extending the optical path, and a photoelectric (O/E) converter 730 converting an optical signal output from the optical cable 720 into an RF signal.

Here, the E/O converter 710 may employ an analog modulation scheme of amplitude-modulating an output from a laser diode by using an RF signal, and the O/E converter 730 may employ an analog amplitude modulation/demodulation scheme of detecting an amount of input light by using an optical sensor such as a photodiode, or the like, and outputting a corresponding signal.

As for the E/O converter 710 and the O/E converter 730, it is important to use an element or a component capable of providing a sufficient bandwidth according to a dynamic range of measurement altitude.

In FIG. 3, it is illustrated that the path extending unit 700 is inserted between the modulation switch 510 and the power amplifier 515, namely, in the transmitting end, but it may also be inserted into the receiving end, for example, into the portion indicated by (a). In addition, the path extending unit 700 may also be installed to be inserted into a certain point in a signal transmission path.

FIG. 4 is a block diagram illustrating a configuration of an FM-CW radio altimeter according to an exemplary embodiment of the present disclosure.

Referring to FIG. 4, the FM-CW radio altimeter according to an exemplary embodiment of the present disclosure may include a path extending unit 700 inserted between a directional coupler 610 and a power amplifier 615, and here, the path extending unit 700 may include an optical cable 720.

The path extending unit 700 may be positioned between transmission and reception to serve to delay a signal provided from the outside to reduce a dynamic range of the radio altimeter. Here, since the path extending unit 700 includes the optical cable 720, in the case in which the extended optical path is 200 meters, a minimum measurement altitude is 101 meters, whereby, in the FM-CW radar scheme, the beat frequency Fb according to altitude is changed 100 times, and this degree of frequency range may allow for sufficiently accurate measurement and, in actual implementation, a bandwidth of the receiving end can be considerably reduced. Namely, the path extending unit 700 may reduce the dynamic range of the radio altimeter to $1/10$ to $1/1,000$, and in this case, the optical cable 720 may be formed to have a length sufficient for reducing a frequency band of transceiver components of the radio altimeter to $1/10$ to $1/1,000$.

In the case of uniformly maintaining the beat frequency Fb according to altitude through feedback, the beat frequency Fb may be uniformly maintained when it is designed such that frequency variations Δf (or fm) is changed about only 100 times, and thus, an actual implementation is non-problematic.

In addition to the optical cable 720, the path extending unit 700 further includes an electrooptic (E/O) converter 710 and a photoelectric (O/E) converter 730. Here, the E/O converter 710 may employ an analog modulation scheme of amplitude-modulating an output from a laser diode by using an RF signal, and the O/E converter 730 may employ an analog amplitude modulation/demodulation scheme of detecting an amount of input light by using an optical sensor such as a photodiode, or the like, and outputting a corresponding signal.

In FIG. 4 it is illustrated that the case in which the path extending unit 700 is inserted between the directional coupler 610 and the power amplifier 615, namely, in the transmitting end, but it may also be inserted into the receiving end, for example, into the portion indicated by (a). In addition, naturally, the path extending unit 700 may also be installed to be inserted into a certain point in a signal transmission path.

While the present invention has been shown and described in connection with the embodiments, it will be apparent to those skilled in the art that modifications and variations can be made without departing from the spirit and scope of the invention as defined by the appended claims.

INDUSTRIAL APPLICABILITY

The present invention provides a radio altimeter effectively coping with a wide measurement range from a short range to a medium and long range, and thus, it may be very useful for the aviation industry or defense industry.

The invention claimed is:

1. A radio altimeter including:
    a voltage controlled oscillator outputting a radio frequency signal through a forward path, the forward path being a signal transmission path for transmitting the radio frequency signal in a direction from the voltage controlled oscillator to a radio frequency antenna;
    a path extending unit that is positioned in the forward path and receives the radio frequency signal through the forward path to delay the radio frequency signal and generate a delayed radio frequency signal, wherein the path extending unit comprises:
        an electro-optical (E/O) converter converting the radio frequency signal into an optical signal;
        an optical cable delaying the optical signal; and
        a photoelectric (O/E) converter re-converting the delayed optical signal into the delayed radio frequency signal;
    the radio frequency antenna, the antenna configured to transmit the delayed radio frequency signal to ground and receive the delayed radio frequency signal reflected from the ground;
    a mixer that receives the reflected delayed radio frequency signal through a signal reception path from the radio frequency antenna and the radio frequency signal from the voltage controlled oscillator and mixes the radio frequency signal and the reflected delayed radio frequency signal to output a beat frequency signal which is used to calculate altitude with respect to the ground;
    a directional coupler that divides the radio frequency signal output from the voltage controlled oscillator; and
    a power amplifier of which output signal is provided to the radio frequency antenna,
    wherein the path extending unit is positioned between the directional coupler and the power amplifier.

2. The radio altimeter of claim 1, wherein the path extending unit is positioned only in the forward path.

* * * * *